United States Patent [19]
Braconnier

[11] Patent Number: 5,746,944
[45] Date of Patent: *May 5, 1998

[54] GRANULAR LANTHANUM/CERIUM/TERBIUM/MIXER PHOSHATES HAVING CHARACTERISTIC MORPHOLOGY AND GREEN LUMINOPHORS COMPRISED THEREOF

[75] Inventor: Jean-Jacques Braconnier, Lagord, France

[73] Assignee: Rhone-Poulenc Chimie, Courbevoie Cedex, France

[*] Notice: The term of this patent shall not extend beyond the expiration date of Pat. No. 5,470,503.

[21] Appl. No.: 810,505

[22] Filed: Feb. 28, 1997

Related U.S. Application Data

[63] Continuation of Ser. No. 98,727, Jul. 29, 1993, abandoned.

[30] Foreign Application Priority Data

Jul. 29, 1992 [FR] France .................. 92 09355

[51] Int. Cl.⁶ .................................................. C09K 11/83
[52] U.S. Cl. ............................... 252/301.4 P; 423/263
[58] Field of Search .................. 423/263; 252/301.4 P

[56] References Cited

U.S. PATENT DOCUMENTS

| | | | |
|---|---|---|---|
| 3,507,804 | 4/1970 | Ropp | 252/301.4 P |
| 4,423,349 | 12/1983 | Nakajima et al. | 252/301.4 P |
| 4,447,756 | 5/1984 | Kohmoto et al. | 313/487 |
| 5,091,110 | 2/1992 | Fan et al. | 252/301.4 P |
| 5,314,641 | 5/1994 | Collin et al. | 252/301.4 P |
| 5,340,556 | 8/1994 | Collin et al. | 252/301.4 P |
| 5,470,503 | 11/1995 | Braconnier | 252/301.4 P |

FOREIGN PATENT DOCUMENTS

| | | |
|---|---|---|
| 0 456 936 | 11/1991 | European Pat. Off. . |
| 0 498 689 | 8/1992 | European Pat. Off. . |
| 2 356 709 | 1/1978 | France . |
| 83 12271 | 6/1984 | France . |
| 27 29 105 | 1/1978 | Germany . |
| 33 26 921 | 9/1987 | Germany . |
| 33 48 146 | 1/1992 | Germany . |
| 865787 | 9/1981 | U.S.S.R. .................. 423/263 |

OTHER PUBLICATIONS

Ropp I "J. Electrochem Soc.", vol. 115, No. 5, 1968 pp. 531–535.

Technisch–wissenschaftliche Abhandlungen der Osram–Gesellschaft, 1986, no month.

Butler, "Fluorescent Lamp Phosphors, Technology and Theory," The Pennsylvania State University Press, 1980, pp. 26 and 82, no month.

Hoffman, "Effect of Thorium on $Ce^{+3}$ Phosphors," J. Electrochem. Soc.: Solid State Science, Sep. 1971, pp. 1508–1510.

Nishia Technical Data, Lamp Phosphor NP–220, 1983, no month.

Chemical Abstracts, vol. 83, No. 24, 15 Dec. 1975, Columbus, Ohio, US; abstract No. 201293k, p. 565.

Chemical Abstracts, vol. 96, No. 8, 22 Feb. 1982, Columbus, Ohio, US; abstract No. 54741t, p. 153.

Chemical Abstracts, vol. 91, No. 10, 3 Sep. 1979, Columbus, Ohio, US; abstract No. 82318a, p. 537. & Nippon Kagaku Kaishi, vol. 6, 1979, pp. 733–738 Y. Hikichi et al.

*Primary Examiner*—Melissa Bonner
*Attorney, Agent, or Firm*—Burns, Doane, Swecker & Mathis, L.L.P.

[57] ABSTRACT

Monodisperse particulates of lanthanum/cerium/terbium phosphates, the average particle size of which ranging from 1 to 15 -microns and preferably from 2 to 6 microns, and having a dispersion index of less than 0.5, preferably less than 0.4, are well suited as green luminophors displaying enhanced brilliance or precursors thereof, and are prepared via precipitation with phosphate ions at a substantially constant pH below 2, from LaCeTb solutions.

32 Claims, No Drawings

GRANULAR LANTHANUM/CERIUM/ TERBIUM/MIXER PHOSHATES HAVING CHARACTERISTIC MORPHOLOGY AND GREEN LUMINOPHORS COMPRISED THEREOF

This application is a continuation of application Ser. No. 08/098,727, filed Jul. 29, 1993, now abandoned.

CROSS-REFERENCE TO COMPANION APPLICATION

My copending application Ser. No. 08/098,818, now U.S. Pat. No. 5,470,303, filed concurrently herewith and assigned to the assignee hereof.

BACKGROUND OF THE INVENTION

1. Field of the Invention

The present invention relates to novel green luminophors based on lanthanum/cerium/terbium mixed phosphates, optionally containing additives, possessing improved particle size as well as improved brilliance.

The present invention also relates to such lanthanum/cerium/terbium mixed phosphate precursors of said novel green luminophors, the same also having characteristic improved morphology.

This invention also relates to the synthesis of both said luminophors, as well as the mixed phosphate precursors thereof.

2. Description of the Prior Art

The rare earth mixed phosphates, and in particular those of lanthanum, cerium and terbium, are known to this art to possess advantageous properties of luminescence.

Thus, numerous lanthanum/cerium/terbium mixed phosphates (also referred to more commonly as "LaCeTb phosphates") having different concentrations of lanthanum, cerium and terbium have been developed since the beginning of the 1970s, such compounds optionally containing certain dopants or doping elements (Li, Na, K, Th, B, etc.) as additives for the purpose of promoting and/or further strengthening their luminescence potential. Luminophors based on such compounds are available on an industrial scale, for example in the field of low pressure mercury lamps.

Many processes for the preparation of LaCeTb phosphates are known to this art. These may generally be classified in two principal categories: (i) the so-called "dry-treatment" processes and (ii) the so-called "wet-treatment" processes.

The dry-treatment processes, which are described, in particular, in JP-62/007,785, WO-82/04,438, JP-62/089,790, JP-59/179,578 and JP-62/000,579, entail providing a mixture of the oxides of the different rare earths, or a mixed oxide of said rare earths, and then phosphatizing this mixture or this mixed oxide, by calcining in the presence of diammonium phosphate. In light of the fact that the yield of the phosphatizing must be close to 100% in order to obtain a luminophor which is as pure as possible, and hence which exhibits maximum emission efficiency, these processes require taking many precautions and relatively lengthy treatments.

The wet-treatment processes, such as those described, in particular, in JP-57/023,674, JP-60/090,287 and JP-62/218, 477, entail a direct synthesis, in a liquid reaction medium, of a rare earth mixed phosphate, or of a mixture of rare earth phosphates, this typically being carried out by attacking a solid compound containing the rare earths (carbonate and/or oxide) by means of a phosphoric acid solution to precipitate the corresponding phosphates. However, it is also possible to carry out the direct precipitation of the phosphate from a solution of soluble rare earth salts. Thus, in U.S. Pat. No. 3,507,804, a process is described for the preparation of a lanthanum/terbium double phosphate, comprising precipitating the phosphate from a solution of the nitrates of these elements and addition of phosphoric acid. However, among other problems, the phosphate or phosphates produced are very difficult to filter off.

Furthermore, in published French patent application No. 91/01,215, assigned to the assignee hereof, a process is described for the synthesis of a rare earth mixed phosphate, comprising mixing a solution of soluble lanthanum, cerium and terbium salts with phosphate ions, with control of the pH of the precipitation medium by maintaining same at a constant value above 2, and then permitting the precipitate thereby obtained to age or ripen. Although this process makes it possible, among other advantages, to satisfactorily overcome the filtration problems encountered in the conventional techniques employing direct precipitation (production of gels or precipitates which are very difficult to filter off), it nevertheless yields products whose particle size distribution may be considered to be inadequate, since the dispersion index of the particles of which both the mixed phosphate precursor and the resulting luminophor are comprised is greater 0.5.

The different processes indicated above, whether based on a dry treatment or a wet treatment, present the major common drawback of yielding lanthanum/cerium/terbium mixed phosphates possessing an uncontrolled particle size, especially a particle size distribution which is not narrow or which is, at least, insufficiently narrow. Thus, serious need continues to exist for monodisperse particles having uniform and narrowly defined particle size that are useful for the manufacture of efficacious luminophors, namely, luminophors which, on the one hand, are easy to incorporate in lamps (coatings in fine, homogeneous layers), and, on the other, exhibit optimal luminescence, in particular brilliance. Indeed, it has now been determined that the quality of the final luminophor is essentially and singularly dependent on the quality of the starting precursor.

Moreover, another problem in this art is the fact that the mixed phosphates known to date require, for their conversion into luminophors, thermal treatments at high temperatures, carried out in the region of 1,200° C. using flux and under a reducing atmosphere. This latter requirement is by reason of the necessity to convert the two species cerium and terbium to their oxidation state 3+, and/or to maintain them in this state, in order for the resulting LaCeTb phosphate to actually be a green luminophor. These treatments, other than being lengthy, expensive and intricate to carry out, induce further disordering of the particle size (which is itself already imperfect) of the starting precursor. Thus, luminophor particles are produced which are not homogeneous in size, which can, in addition, contain greater or smaller amounts of impurities because, in particular, of the use of the flux, and, finally, whose performance in luminescence, and especially in brilliance, is inadequate for the desired end applications.

SUMMARY OF THE INVENTION

Accordingly, a major object of the present invention is the provision of novel granular LaCeTb mixed phosphates which possess an improved particle size, and, more especially, an improved particle size distribution.

Another object of the present invention is the provision of novel granular LaCeTb mixed phosphates which can be converted into green luminophors by thermal treatments that do not require the use of flux and/or of a reducing atmosphere.

Still another object of this invention is the provision of novel granular LaCeTb mixed phosphates from which green luminophors having improved properties can be produced, in particular improved in respect of particle size and of brilliance.

Still another object of the present invention is the provision of novel luminophors based on LaCeTb mixed phosphates which possess an improved particle size, and, more especially, and improved particle size distribution.

Still another object of this invention is the provision of novel luminophors based on LaCeTb mixed phosphates having improved luminescence, and, especially, improved brilliance.

Yet another object of the present invention is the provision of certain unique, simple, economical, reproducible and controllable syntheses for the preparation of the aforesaid novel mixed phosphates and luminophors produced therefrom.

Briefly, the present invention features a unique process for preparing lanthanum/cerium/terbium mixed phosphates, comprising providing a medium of precipitation by introducing, in continuous manner and with stirring, a first solution of soluble lanthanum, cerium and terbium salts into a second solution containing phosphate ions and having an initial pH below 2, controlling the pH of such precipitation medium at a substantially constant value below 2 during the resulting precipitation, then recovering the precipitate thereby obtained and lastly, where appropriate, thermally treating said precipitate.

The present invention also features particulates of the lanthanum/cerium/terbium mixed phosphates thus produced, having the general formula $La_xCe_yTb_{(1-x-y)}PO_4 \cdot zH_2O$, in which x is a number ranging from 0.4 to 0.6, inclusive, x+y is a number greater than 0.8 and z is a number ranging from 0 to 2, inclusive, said phosphate particulates having an average particle size ranging from 1 to 15 microns and a dispersion index of less than 0.5.

This invention also features the conversion of the subject mixed phosphates into green luminophors via appropriate thermal treatment, carried out with or without flux, under or without a reducing atmosphere depending upon the particular case, these luminophors being essentially characterized in that they retain the excellent particle size distribution of the starting mixed phosphates, namely, these too have an average particle size ranging from 1 to 15 microns and a dispersion index of less than 0.5. Moreover, these luminophors exhibit an improved, indeed exceptional, brilliance (brilliance assessed by measurement of "conversion efficiency" as defined hereinafter).

DETAILED DESCRIPTION OF PREFERRED EMBODIMENTS OF THE INVENTION

More particularly according to the present invention, the process for the synthesis of the subject novel LaCeTb mixed phosphates proceeds as follows:

According to the invention, a lanthanum/cerium/terbium mixed phosphate is directly precipitated at a controlled pH, by reacting a first solution of soluble lanthanum, cerium and terbium salts, containing these elements in the requisite stoichiometric proportions to produce the desired final compound, with a second solution containing phosphate ions.

In a first essential parameter of the process according to the invention, a certain order of introduction of the reactants must be observed, and, still more specifically, the solution of the soluble rare earth salts must be introduced, gradually and continuously, into the solution containing the phosphate ions.

In a second essential parameter of the process of the invention, the initial pH of the solution containing phosphate ions must be below 2, and preferably is at least 1.

In a third essential parameter of the process according to the invention, the pH of the precipitation medium must then be controlled at a pH value below 2, and preferably at a value of at least 1.

By a "controlled pH" is intended maintenance of the pH of the precipitation medium at a certain constant or substantially constant value by adding basic compounds or buffer solutions to the solution containing the phosphate ions. This is carried out simultaneously with the introduction into the latter solution of the solution containing the soluble rare earth salts. The pH of the medium will thus vary by not more than 0.5 pH unit around the desired set value, and, preferably, by not more than 0.1 pH unit around this value. The desired set value will advantageously correspond to the initial pH (below 2) of the solution containing phosphate ions.

According to the present invention, this control of the pH is advantageously carried out via addition of a basic compound, as will be more fully described below.

The precipitation is preferably carried out in an aqueous medium at a temperature which is not critical and which advantageously ranges from room temperature (15° C.–25° C.) to 100° C. This precipitation takes place while the reaction medium is stirred.

The concentrations of the rare earth salts in the first solution can vary over wide limits. Thus, the total concentration of rare earths advantageously ranges from 0.01 mol/liter to 3 mol/liter.

Suitable rare earth salts for the invention are, in particular, salts which are soluble in an aqueous medium, such as, for example, the nitrates, chlorides, acetates and carboxylates, or admixture thereof. The preferred salts according to the invention are the nitrates.

It should be appreciated that the solution of lanthanum, cerium and terbium salts can comprise, in addition, other metal salts such as, for example, salts of other rare earths, of other alkali metals, of thorium, of boron, and the like, for the purpose of obtaining LaCeTb phosphates doped with such other elements, as is known to this art.

The phosphate ions which are to be reacted with the solution of the rare earth salts may be provided by pure compounds, or compounds in solution, such as, for example, phosphoric acid, alkali metal phosphates or the phosphates of other metallic elements providing a soluble compound with the anions associated with the rare earths.

In a preferred embodiment of the invention, the phosphate ions are added in the form of ammonium phosphates, since the ammonium cation will decompose during the subsequent calcining, thereby enabling a mixed phosphate of very high purity to be obtained. Among the ammonium phosphates, diammonium and monoammonium phosphates are the preferred compounds for carrying out the process of the invention.

The phosphate ions are present in an amount such there exists a $PO_4$/RE mole ratio of greater than 1, and advantageously ranging from 1.1 to 3.

As emphasized above, the solution containing phosphate ions must initially (i.e., prior to the start of introduction of the solution of rare earth salts) possess a pH below 2, and preferably of at least 1. Thus, if the solution used does not naturally possess such a pH, the pH is adjusted to the desired appropriate value either by adding a base (for example ammonia solution, in the case of an initial solution of phosphoric acid), or by adding an acid (for example nitric acid, in the case of an initial solution of diammonium phosphate).

Thereafter, during the introduction of the solution containing the rare earth salts, the pH of the precipitation medium gradually decreases. Thus, according to one of the essential parameters of the process according to the invention, with the object of maintaining the pH of the precipitation medium at the desired constant working value, which must be below 2 and preferably is at least 1, a base is introduced simultaneously into this medium.

Suitable basic compounds according to the invention include metal hydroxides (NAOH, KOH, Ca(OH)$_2$, etc.) or ammonium hydroxide, or any other basic compound whose constituent species will not form any precipitate when they are added to the reaction medium, by combination with one of the species additionally contained in this medium, and which permits control of the pH of the precipitation medium.

In another preferred embodiment of the invention, this basic compound is advantageously a compound that can readily be removed, either with the liquid phase of the reaction medium and washing of the precipitate, or by thermal decomposition during the calcining of the mixed phosphate.

Thus, the preferred basic compound of the invention is ammonia, advantageously employed in the form of aqueous solution thereof.

At the end of the precipitation step, an LaCeTb mixed phosphate, optionally containing other additive elements, is obtained directly. The overall concentration of rare earths in the final precipitation medium is then advantageously greater than 0.25 mol/liter. The phosphate precipitate may be recovered by any means known per se, especially by simple filtration. Indeed, under the conditions of the process according to the invention, a non-gelatinous LaCeTb phosphate that can be readily filtered off is precipitated. The product recovered can then be washed, for example with water, to remove any impurities therefrom, in particular adsorbed nitrate and/or ammonium functions.

Finally, it can be treated thermally, under various conditions selected essentially dependent on the degree of conversion desired for the final product (nature of the crystalline phase, degree of hydration, purity, level of luminescence, and the like), as will be more fully described below. Whether or not subsequent thermal treatments are carried out, it should be appreciated that the process according to the invention always yields granular or particulate products possessing a fine and extremely narrowly defined particle size.

The novel lanthanum/cerium/terbium mixed phosphate particulates of the invention will now be more fully described.

The lanthanum/cerium/terbium mixed phosphates according to the invention, in particulate state, have the general formula:

$$La_xCe_yTb_{(1-x-y)}PO_4 \cdot zH_2O$$

in which x is a number ranging from 0.4 to 0.6, inclusive, x+y is a number greater than 0.8 and z is to a number ranging from 0 to 2, inclusive, and the particles of which have an average size ranging from 1 to 15 microns, preferably from 2 to 6 microns, with a dispersion index of less than 0.5, and preferably less than 0.4.

The particles exhibit a size distribution which is both monodisperse and extremely narrowly defined around the average value, a result hitherto unknown to this art.

The average diameter of the particles is measured using a CILAS type laser granulometer (CILAS HR 850).

The dispersion index I is, for its part, determined by the formula:

$$I = \frac{\phi_{84} - \phi_{16}}{2\phi_{50}}$$

in which $\phi_{84}$ is the particle diameter for which 84% of the particles have a diameter less than $\phi_{84}$; $\phi_{16}$ is the particle diameter for which 16% of the particles have a diameter less than $\phi_{16}$; and $\phi_{50}$ is the average diameter of the particles.

These LaCeTb orthophosphates can display a crystalline form of either the hexagonal or the monoclinic type, essentially in accordance with the temperature "experienced" by the products during their preparation.

Thus, more specifically, the hexagonal state corresponds to mixed phosphates which have either been subjected to no subsequent thermal treatment (for example a crude precipitation product), or indeed subjected to a thermal treatment, but at a temperature generally not exceeding 600° C. The monoclinic state corresponds to mixed phosphates which are obtained after an elaborate thermal treatment carried out at a temperature at least above 600° C., and advantageously ranging from 700° C. to 1,000° C., for purposes of effecting conversion of the hexagonal crystalline phase into a pure monoclinic phase.

A product which has not been thermally treated is generally hydrated; however, simple drying operations performed, for example, at from 60° to 100° C. suffice to remove the larger fraction of this residual water and to provide substantially anhydrous LaCeTb phosphates, the minor amounts of remaining water being, for their part, removed by calcining operations conducted at temperatures above approximately 400° C.

Moreover, the mixed phosphates according to the invention surprisingly have very low cerium IV and terbium IV concentrations, even after calcining at a high temperature in air.

This small proportion of these two species may be demonstrated by a colorimetric test, by determining the characteristic coordinates of the color of a body in the CIE 1976 (L*, a*, b*) system as defined by the Commission Internationale d'Eclairage (International Commission on Illumination), and reported in the Compendium of French Standards (AFNOR) calorimetric colour No. X08-012 (1983). These coordinates are determined using a calorimeter marketed by Pacific Scientific.

Thus, the LaCeTb phosphates of the invention exhibit, after calcining at 700° C. in air, a lightness, represented by the coordinate L*, of greater than 98%, and advantageously ranging from 99 to 99.99%.

This coordinate L* permits the white color of the product, which is itself directly dependent on the presence of colored species therein, such as cerium and/or terbium in the oxidation state 4+, to be measured.

The products of the invention also possess color coordinates a* and b* of from −0.5 to +0.5, approximately, and preferably from −0.25 to +0.50.

These excellent values of lightness L*, a*, b* are also obtained with calcining temperatures of from 700° C. to 900° C. This indicates an exceptional stability of the compounds of the invention in a non-reducing atmosphere.

It is also possible to assess the presence or absence of cerium and/or terbium in the oxidation state 4+ by surface analysis of the products via the XPS technique which is, in particular, described in Praline et al, *Journal of Electron Spectroscopy and Related Phenomena*, 21, pp. 17–30 and 31–46 (1981).

It is indicated in this manner that the products according to the invention possess, in the energy range corresponding to the 3d electrons of cerium, two doublets characteristic of the oxidation state 3+ and the absence of a satellite, located at 32.7 eV from the first peak, characteristic of a degree of oxidation of 4+.

The mixed phosphates according to the invention hence comprise cerium and terbium atoms stabilized in the oxidation state 3+, permitting use of any atmosphere, namely, either a reducing or a non-reducing atmosphere, and especially an oxidizing atmosphere such as air, during the calcining operation. The calcined product obtained will contain cerium and terbium in the oxidation state 3+, cerium and terbium in the oxidation state 4+ being present only in trace amounts or completely absent. In addition, since the cerium and terbium are present in the oxidation state 3+, the mixed phosphates of the invention permit green luminophors exhibiting high luminescence to be obtained.

Depending on the temperatures at which they have been calcined, the mixed phosphates according to the invention can contain greater or lesser residual amounts of ammonium ions. Thus, before calcining or after calcining at a temperature below 500° C., they generally contain not more than 5% by weight of ammonium ions, and preferably not more than 2% by weight. In all instances, these ammonium ions may be removed by thermal decomposition or evaporation during calcining operations performed at higher temperatures, especially above 600° C.

Similarly, the mixed phosphates of the invention possess specific surface areas which vary according to the calcining temperatures to which they have been subjected, these specific surfaces decreasing steadily with these temperatures. Thus, as one example, after thermal treatment at a temperature below 600° C., the phosphates possess a specific surface area of not less than 30 m²/g; after calcining at 800° C., this surface area is on the order of around ten m²/g, approximately, and, after calcining at 900°–1,000° C., it decreases to values generally below approximately 5 m²/g.

Such specific surface area is measured by the BET method, being determined by adsorption of nitrogen according to ASTM Standard D3663-78 established on the basis of the BRUNAUER/EMMETT/TELLER technique described in the *Journal of the American Chemical Society*, 60,309 (1938).

The mixed phosphates of the invention exhibit in addition, the especially notable and advantageous property of not caking during calcining, namely, the particles of which are not, or do not tend to be, agglomerated, and hence do not tend to develop in a final form of large granules from 0.1 to several mm, for example, in size. It is thus not required to carry out a preliminary grinding of the powders before they are subjected to the conventional treatments for producing the final luminophor.

Lastly, as indicated above, the LaCeTb mixed phosphates according to the invention can also comprise other elements that conventionally serve, in particular, as promoters of luminescence or as stabilizers of the oxidation states of the elements cerium and terbium. Exemplary thereof are, more especially, alkali metals (Li, Na, K, etc.), thorium and boron.

Although the lanthanum/cerium/terbium mixed phosphates according to the invention display, after being subjected to a thermal treatment at a temperature generally above 600° C., and advantageously ranging from 700° to 1,000° C., luminescence at wavelengths in the region of 550 nm (i.e., in the green) after exposure to radiation of wavelength 254 nm, it may prove necessary to further improve these luminescence properties via post-treatments on the products to provide a true luminophor which is directly usable, as such, in the desired final application. These luminophors, per se, constitute another aspect of the present invention.

It will be appreciated that the dividing line between an LaCeTb phosphate according to the invention and a luminophor, also according to the invention, remains, on final analysis, rather arbitrary, and depends only on the luminescence threshold from which a product is considered to be directly acceptable by the end user.

In the present case, the LaCeTb phosphates according to this invention which have not been subjected to thermal treatments above approximately 1,000° C. may be regarded and identified as luminophor precursors, since such products generally possess conversion efficiencies (as explained below) of less than 60%. Consequently, these may be judged as not satisfying the minimum criterion of brilliance of commercial luminophors capable of being used directly, without any subsequent conversion. Conversely, the lanthanum/cerium/terbium mixed phosphates which, after being subjected to suitable treatments, develop appropriate conversion efficiencies, namely, of at least 60%, are qualified according to the present invention as luminophors.

According to the present invention, by subjecting the LaCeTb mixed phosphates of the invention, as described in detail above, to particular thermal treatments, green luminophors based on LaCeTb phosphates are provided, possessing, on the one hand, an improved particle size and especially an improved particle size distribution, and, on the other, exceptional brilliance.

In another embodiment of the process for preparing these novel green luminophors based on lanthanum/cerium/terbium mixed phosphates, the lanthanum/cerium/terbium mixed phosphates of the invention (precursors) are subjected to a thermal treatment using a "flux". It will be appreciated that such a treatment is itself well known to this art, and is traditionally used in the processing of the principal luminophors, in particular for adapting the latter to the desired application (morphology of the particles, surface state, brilliance, for example).

Suitable fluxes include, in particular, lithium fluoride, lithium chloride, potassium chloride, ammonium chloride, boron oxide and ammonium phosphates, etc. The flux is mixed with the mixed phosphate to be treated, and the mixture is then heated to a temperature above 1,000° C., generally ranging from 1,000° C. to 1,200° C., under a necessarily reducing atmosphere. After treatment, the product is washed and then rinsed to obtain the purest possible luminophor in a non-agglomerated state.

In still another embodiment of the process according to the invention, the LaCeTb mixed phosphates of the invention are simply treated thermally in the absence of any flux at a temperature above 1,000° C., and generally ranging from 1,000° C. to 1,200° C. This particular embodiment is preferred since, in this instance, other than the fact that the use of a flux is avoided, it was found that the calcining could be conducted equally well under a reducing or a non-reducing atmosphere, especially under an oxidizing atmosphere such as, for example, air. This latter attribute constitutes an especially important advantage for a process of manufacture of green luminophors based on LaCeTb phosphates, the conventional processes of the prior art always requiring reducing, and hence expensive, atmospheres. Of course, it is entirely possible, although less economical, to also employ (again, in the context of this second embodiment), reducing atmospheres (for example hydrogen) or neutral atmospheres (for example argon), or mixtures of these.

Regardless of which of the above techniques is employed, a luminophor based on LeCeTb phosphate is always obtained, of crystalline structure of the monoclinic type, having an average particle size ranging from 1 to 15 microns, and preferably from 2 to 6 microns, with a very low dispersion index, of less than 0.5 and preferably less than 0.4.

The average size and the dispersion index of the particles are determined according to the methods described above.

If the luminophor has been obtained according to a so-called flux method, it is found that each of the particles of which the above product is composed is, in fact, a single monocrystal of generally polyhedral shape.

Otherwise, these particles appear spheroidal in shape, and comprise an aggregate of small crystallites whose average size can range from 100 nm to 300 nm.

As indicated above, the novel luminophors according to the invention possess, in luminescence, exceptional brilliance. This brilliance was rigorously appraised by means of a measurement, expressed relative to a fixed standard, of the conversion efficiency of the luminophor.

The conversion efficiency is the comparison between the number of photons emitted by a luminophor and the number of photons constituting the excitation radiation.

The evaluation of the conversion efficiency entails measuring, in the visible range of the electromagnetic spectrum, the emission of a luminophor under monochromatic excitation of wavelength 254 nm. The brilliance value obtained (emission intensity integrated between 380 and 780 nm) is then compared with that of a reference luminophor, namely, Mn-doped $Zn_2SiO_4$ which is available from the National Bureau of Standards under reference NBS 1028, the known efficiency of which is 65%.

The luminophors according to the invention can thus exhibit a conversion efficiency greater than or equal to 70%, an unexpectedly exceptional value hitherto unknown to this art for this type of product. In this instance, it will be appreciated that the molar content of terbium in the luminophor is generally at least 13% ($x+y<0.87$).

It has, in addition, been observed that the luminophors obtained according to a flux method possess excellent stability of their brilliance properties over time, which properties are maintained at markedly improved values compared to the luminophors based on LaCeTb mixed phosphate of the prior art. This stability may be assessed using conventional aging tests (simulation of the behavior in a lamp), better known in the luminophor art by the term "baking" test. This test entails calcining, for 10 min at 600° C. an in air, a thin layer of luminophor deposited with a conventional binding agent onto an inert support (glass), and measuring the new conversion efficiency of the luminophor thus treated. For the luminophors according to the invention, the decrease in conversion efficiency does not exceed 1% in relative value.

Lastly, also as indicated above, the novel luminophors according to the invention can naturally contain, in addition, various doping elements such as alkali metals (Li, Na, K, etc.), thorium and boron.

In order to further illustrate the present invention and the advantages thereof, the following specific examples are given, it being understood that same are intended only as illustrative and in nowise limitative.

EXAMPLE 1

500 ml of an aqueous solution of rare earth nitrates of overall concentration 1.5 mol/l, and constituted as follows: 0.825 mol/l of $La(NO_3)_3$; 0.45 mol/l of $Ce(NO_3)_3$ and 0.225 mol/l of $Tb(NO_3)_3$, were added over the course of one hour to 500 ml of an aqueous solution of phosphoric acid $H_3PO_4$ previously adjusted to pH 1.4 by adding aqueous ammonia solution and heated to 60° C., to effect the precipitation thereof.

The phosphate/rare earths mole ratio was 1.15. The pH during the precipitation was adjusted to 1.4 by adding aqueous ammonia solution.

At the end of the precipitation step, the reaction medium was maintained for one additional hour at 60° C.

The precipitate was then readily recovered by filtration, washed with water and thereafter dried at 60° C. in air. The product then was in the form of a white powder (appearance of a talc) of 3- to 6-micron particles (agglomerates) composed of compact, approximately 250-nm aggregates, which were themselves formed by aggregation of elementary crystallites between 30 and 150 nm in size. The powder was then subjected to a thermal treatment at 900° C. in air.

X-ray analysis evidenced that the product was an LaCeTb orthophosphate of monoclinic crystalline structure. It comprised compact, approximately 250-nm grains agglomerated in the form of spherical particles ranging from 3 to 6 microns in size. CILAS granulometry, measured after brief disintegration of the agglomerates by means of ultrasound, provided a $\phi_{50}$ of 4.5 microns with a very narrow distribution, since the dispersion index was only 0.4.

EXAMPLE 2

An aqueous solution of rare earth nitrates of overall concentration 2.5 mol/l, and containing these elements in a molar proportion identical to that of Example 1, was added over the course of one hour to an aqueous solution of monoammonium phosphate acidified to pH 1.5 by adding nitric acid and heated to 60° C. The phosphate/rare earths mole ratio was 1.1, and the pH during the precipitation was adjusted to 1.5 by adding aqueous ammonia solution. At the end of the precipitation step, the reaction medium was maintained for one additional hour at 60° C.

The precipitate was then readily recovered by filtration and thereafter washed with water. It was in the form of a white powder (appearance of a talc) corresponding to a hydrated LaCeTb phosphate of hexagonal crystalline structure. Its volatile matter content was approximately 30% by weight.

The precipitate was subjected to a thermal treatment at 900° C. in air. This calcining produced a fine, perfectly white powder of composition corresponding to an LaCeTb orthophosphate, with a monoclinic crystalline structure, and comprising 3- to 6-micron agglomerates. CILAS granulometry, measured after brief disintegration of the agglomerates of the product by means of ultrasound, provided a $\phi_{50}$ of 6 microns with a very narrow distribution, since the dispersion index was only 0.4.

EXAMPLE 3

The powder of LaCeTb mixed phosphate obtained in Example 2 was converted into a luminophor by calcination using a flux.

To this end, 1% by weight of LiF was first added to this powder, the entire mass was then mixed in a TURBULA type mixer for homogenization, and the resulting mixture was introduced into a closed crucible made of ultrapure alumina. The calcining, which was carried out for two hours at 1,000° C. and under a stream of argon containing hydrogen (1% of hydrogen), was then followed by a wash with 15% nitric acid at 80° C. to break up the agglomerates, and thereafter by a rinse with water and drying.

A green luminophor whose particle size characteristics (CILAS) were as follows was thereby obtained:

(a) $\phi_{50}$: 7.7 microns, (b) dispersion index I: 0.45.

The conversion efficiency of this luminophor (measured relative to the Mn-doped $Zn_2SiO_4$ standard, of efficiency equal to 65%) was greater than 70%.

EXAMPLE 4

The powder obtained in Example 2 was, in this instance, converted into a luminophor without employing a flux.

This powder was placed in the same crucible as that of Example 3, and was then calcined for two hours at 1,1000° C. under argon containing hydrogen (1%).

A luminophor whose characteristics were as follows was obtained:

(a) $\phi_{50}$: 6.2 microns, (b) dispersion index: 0.4, (c) conversion efficiency: greater than 70%.

EXAMPLE 5

The procedure of Example 4 was repeated, but employing a calcination in air.

The characteristics of the luminophor obtained were identical to those of the luminophor of Example 4.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Monodisperse particulates of a lanthanum/cerium/terbium mixed phosphate having the formula

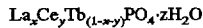

in which x is a number within a range from 0.4 to 0.6, x+y is a number greater than 0.8 and z is a number within a range from 0 to 2, the average particle size of which is within a range from 1 to 15 microns and having a dispersion index of 0.45 or less, wherein said particulates exhibit color coordinates a* and b* ranging from –0.5 to 0.5 after calcination in air at a temperature between 700° and 900° C.

2. The monodisperse particulates as defined by claim 1, having an average particle size in a range from 2 to 6 microns.

3. Monodisperse particulates of a lanthanum/cerium/terbium mixed phosphate having the formula

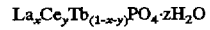

in which x is a number within a range from 0.4 to 0.6, x+y is a number greater than 0.8 and z is a number within a range from 0 to 2, the average particle size of which is within a range from 1 to 15 microns and having a dispersion index of less than 0.4, wherein said particulates exhibit color coordinates a* and b* ranging from –0.5 to 0.5 after calcination in air at a temperature between 700° and 9000° C.

4. The monodisperse particulates as defined by claim 1, in anhydrous state.

5. The monodisperse particulates as defined by claim 1, in hexagonal crystalline state.

6. The monodisperse particulates as defined by claim 1, in monoclinic crystalline state.

7. The monodisperse particulates as defined by claim 1, comprising less than 5% by weight of ammonium ions.

8. The monodisperse particulates as defined by claim 7, comprising less than 2% by weight of ammonium ions.

9. The monodisperse particulates as defined by claim 1, comprising at least one luminescence-enhancing dopant in an amount effective for enhancing luminescence.

10. The monodisperse particulates as defined by claim 1, exhibiting a lightness L*, measured according to AFNOR Standard X08-012, of greater than 98%, after calcinatioin in air at a temperature greater than 700° C.

11. The monodisperse particulates as defined by claim 1, exhibiting a lightness L* within a range from 99% to 99.99%.

12. The monodisperse particulates as defined by claim 1, having a specific surface area of at least 30 m²/g.

13. The monodisperse particulates as defined by claim 1, having a specific surface area on the order of 10 m²/g.

14. The monodisperse particulates as defined by claim 1, having a specific surface area no greater than about 5 m²/g.

15. A process for the preparation of the monodisperse particulates as defined by claim 1, comprising continuously introducing, under stirring, a first solution of soluble salts of lanthanum, cerium and terbium, into a second solution which comprises phosphate ions and has an initial pH below 2, whereby precipitating LaCeTb phosphate particles therefrom, controlling the pH of the medium of precipitation thus formed at a substantially constant value below 2 during said precipitation by adding a basic compound or buffer solution to said medium of precipitation, and then recovering and optionally thermally treating the precipitate thus obtained at a temperature sufficient to achieve a different crystalline state.

16. The process as defined by claim 15, said initial pH being not less than 1.

17. The process as defined by claim 16, comprising controlling said pH at a value of not less than 1.

18. The process as defined by claim 15, said initial pH and said substantially constant pH being about the same.

19. The process as defined by claim 15, said basic compound comprising ammonium hydroxide.

20. The process as defined by claim 15, said second solution comprising a solution of at least one ammonium phosphate.

21. The process as defined by claim 15, said second solution comprising a solution of phosphoric acid.

22. The process as defined by claim 12, said first solution comprising from 0.25 mol/liter to 3 mol/liter of rare earths.

23. The process as defined by claim 15, said soluble salts comprising nitrates, chlorides, acetates, carboxylates, or mixture thereof.

24. The process as defined by claim 23, said soluble salts comprising nitrates.

25. The process as defined by claim 17, said first and second solutions comprising aqueous solutions.

26. The process as defined by claim 17, comprising thermally treating the precipitate thus obtained at a temperature less than about 1,000° C.

27. The process as defined by claim 15, said first solution further comprising a luminescence-enhancing dopant in an amount effective for enhancing the luminescence of the LaCeTb phosphate thus produced.

28. A green luminophor comprising the monodisperse particulates of a lanthanum/cerium/terbium mixed phosphate having the formula $$La_xCe_yTb_{(1-x-y)}PO_4 \cdot zH_2O$$

in which x is a number within a range from 0.4 to 0.6, x+y is a number greater than 0.8 and z is a number within a range from 0 to 2, the average particle size of which is within a range from 1 to 15 microns and having a dispersion index of less than 0.5.

29. A green luminophor precursor comprising the monodisperse particulates as defined by claim 1.

30. A process for the production of a green luminophor, comprising thermally treating the monodisperse particulates as defined by claim 1 at a temperature exceeding about 1,000° C.

31. The monodisperse particulates as defined by claim 1, having color coordinates a* and b* within a range from −0.25 to +0.50.

32. Monodisperse particulates of a lanthanum/cerium/terbium mixed phosphate having the formula $$La_xCe_yTb_{(1-x-y)}PO_4 \cdot zH_2O$$

in which x is a number within a range from 0.4 to 0.6, x+y is a number greater than 0.8 and z is a number within a range from 0 to 2, the average particle size of which is within a range from 1 to 15 microns and having a dispersion index of less than 0.5, wherein in XPS surface analysis said particulates exhibit two doublets in the energy range corresponding to the 3d electrons of cerium and an absence of a satellite, located at 32.7 eV from the first peak, even after calcination at 700° C. in air.

* * * * *